US007228301B2

(12) United States Patent
Meyerzon et al.

(10) Patent No.: US 7,228,301 B2
(45) Date of Patent: Jun. 5, 2007

(54) METHOD FOR NORMALIZING DOCUMENT METADATA TO IMPROVE SEARCH RESULTS USING AN ALIAS RELATIONSHIP DIRECTORY SERVICE

(75) Inventors: Dmitriy Meyerzon, Bellevue, WA (US); Kenji C. Obata, Berkeley, CA (US)

(73) Assignee: Microsoft Corporation, Redmond, WA (US)

( * ) Notice: Subject to any disclaimer, the term of this patent is extended or adjusted under 35 U.S.C. 154(b) by 384 days.

(21) Appl. No.: 10/609,315

(22) Filed: Jun. 27, 2003

(65) Prior Publication Data

US 2004/0267721 A1   Dec. 30, 2004

(51) Int. Cl.
*G06F 7/00* (2006.01)
(52) U.S. Cl. .............................. 707/3; 707/5; 707/101; 707/102
(58) Field of Classification Search ................ 707/1, 707/2, 3, 5, 101, 102
See application file for complete search history.

(56) References Cited

U.S. PATENT DOCUMENTS

| 5,920,859 | A | 7/1999 | Li ................................... 707/5 |
|---|---|---|---|
| 6,151,624 | A * | 11/2000 | Teare et al. .................. 709/217 |
| 6,182,113 | B1 | 1/2001 | Narayanaswami .......... 709/203 |
| 6,222,559 | B1 | 4/2001 | Asano et al. ................ 345/440 |
| 6,247,013 | B1 | 6/2001 | Morimoto .................... 707/10 |
| 6,285,367 | B1 | 9/2001 | Abrams et al. ............. 345/357 |
| 6,349,308 | B1 | 2/2002 | Whang et al. ............... 707/107 |
| 6,516,312 | B1 * | 2/2003 | Kraft et al. ..................... 707/3 |
| 6,601,075 | B1 * | 7/2003 | Huang et al. ............ 707/104.1 |
| 6,628,304 | B2 | 9/2003 | Mitchell et al. ............. 345/734 |
| 6,633,867 | B1 * | 10/2003 | Kraft et al. ..................... 707/3 |
| 6,763,362 | B2 * | 7/2004 | McKeeth .................. 707/104.1 |
| 6,775,659 | B2 | 8/2004 | Clifton-Bligh ................. 707/1 |
| 6,862,710 | B1 | 3/2005 | Marchisio ................ 715/501.1 |
| 6,886,129 | B1 | 4/2005 | Raghavan et al. ........ 715/501.1 |
| 6,931,397 | B1 * | 8/2005 | Sundaresan ..................... 707/5 |

(Continued)

FOREIGN PATENT DOCUMENTS

DE            10029644 A1       1/2002

OTHER PUBLICATIONS 0-7695-1632-7/02 2002 IEEE "Use of Metadata Registries for Searching for Statistical Data" by Chris Nelson.*

(Continued)

*Primary Examiner*—Thomas Lee
*Assistant Examiner*—Sean Weinman
(74) *Attorney, Agent, or Firm*—Merchant & Gould P.C.

(57) ABSTRACT

The present invention provides methods, systems, and computer program products for normalizing document search terms through use of an alias database, as may be found in an alias relationship file, such as a directory service. A gatherer module receives as input (or crawls through) several documents in series or in parallel and can recognize data segments as related to one of the aliases in the alias relationship file. The gatherer then associates the document appropriately so that a search engine may find all documents associated with a search term, regardless of whether the term has undergone several name changes (various aliases) over the course of time. Accordingly, a user may then search for a person's name, and receive as a search result all documents listing the person's name, as well as documents listing, for example, only the person's email address.

24 Claims, 6 Drawing Sheets

U.S. PATENT DOCUMENTS

| | | | | |
|---|---|---|---|---|
| 6,934,714 | B2* | 8/2005 | Meinig | 707/102 |
| 6,947,930 | B2* | 9/2005 | Anick et al. | 707/5 |
| 6,959,326 | B1* | 10/2005 | Day et al. | 709/217 |
| 2001/0042076 | A1 | 11/2001 | Fukuda | 707/500 |
| 2002/0107861 | A1* | 8/2002 | Clendinning et al. | 707/101 |
| 2002/0169770 | A1 | 11/2002 | Kim et al. | 707/5 |
| 2003/0208482 | A1 | 11/2003 | Kim et al. | 707/3 |
| 2004/0049766 | A1* | 3/2004 | Bloch et al. | 717/121 |
| 2004/0117351 | A1* | 6/2004 | Challapalli et al. | 707/2 |
| 2004/0186827 | A1* | 9/2004 | Anick et al. | 707/3 |
| 2004/0215664 | A1 | 10/2004 | Hennings et al. | 707/104.1 |

OTHER PUBLICATIONS

WebDB 2000, LNCS 1997, pp. 38-57, 2001, "Using Metadata to Enhance Web Information Gathering" by Jeonghee Yi, Neel Sundaresan, and Anita Huang.*

Heery, Rachel, "Review of Metadata Formats" *Program*, vol. 30, No. 4, Oct. 1996, (c) *1996 IEEE*, pp. 345,373.

Kucuk, Mehmet Emin, et al., "Application of Metadata Concepts to Discovery of Internet Resources," *ADVIS 2000, INCS 1909*, pp. 304-313, 2000.

Larkey, Leah S., et al., "Collection Selection and Results Merging with Topically Organized U.S. Patents and TREC Data," *Proceedings of the Ninth International Conference on Information Knowledge Management, CIKM 2000*, Nov. 6-11, 2000, pp. 282-289.

Nelson, Chris, "Use of Metadata Registries for Searching for Statistical Data," *IEEE 2002, Dimension EDI Ltd.*, pp. 232-235, 2002.

Schulz, Stefan, et al., "Indexing Medical WWW Documents by Morphemes," *MEDINFO 2001 Proceedings of the 10th World Congress on Medical Informatics, Park I*, IOS Press, Inc., pp. 266-270, 2001.

Sturdy, Derek, "Squirrels and nuts: metadata and knowledge management," *Business Information Review*, 18(4), pp. 34-42, Dec. 2001.

Yi, Jeonghee, et al., "Metadata Based Web Mining for Topic-Specific Information Gathering," *IEEE*, pp. 359-368, 2000.

Yi, Jeonghee, et al., "Using Metadata to Enhance Web Information Gathering," D.Suciu and G.Vossen (Eds.): *WebDB 2000, LNCS 1997*, pp. 38-57, 2001.

U.S. Appl. No. 11/019,091, filed Dec. 21, 2004, entitled "Ranking Search Results Using Feature Extraction", Inventors: Meyerzon et al.

Brin, S. et al., "The Anatomy of a Large-Scale Hypertextual Web Search Engine", Proceedings of the Seventh International World-Wide Web Conference, 'Online! Apr. 14, 1998, pp. 1-26.

Carmel, D. et al., "Searching XML Documents Via XML Fragments", SIGIR Toronto, Canada, Jul.-Aug. 2003, pp. 151-158.

Craswell, N. et al., "TREC12 Web Track as CSIRO", TREC 12, Nov. 2003, 11 pp.

Cutler, M. et al., "A New Study on Using HTML Structures to Improve Retrieval", 11th IEEE International Conference on Chicago, IL, Nov. 9-11, 1999, pp. 406-409.

Eiron, N. et al., "Analysis of Anchor Text for Web Search", Proceedings of the 26th Annual International ACM SIGIR Conference on Research and Development in Information Retrieval, Jul. 28-Aug. 1, 2003, Toronto, Canada, 8 pgs.

Fagin, R. et al., "Searching the Workplace Web", IBM Almaden Research Center, In Proceedings of the Twelfth International World Wide Web Conference, Budapest, 2003, 21 pgs.

Hawking, D. et al., "Overview of the TREC-8 Web Track", TREC, Feb. 2000, pp. 1-18.

Hawking, D., "Overview of the TREC-9 Track", TREC, 2000, pp. 1-16.

Hawking., D. et al., "Overview of the TREC-7 Very Large Collection Track", TREC, Jan. 1999, pp. 1-13.

Hiemstra, D. et al., "Relevance Feedback for Best Match Term Weighting Algorithms in Information Retrieval", Proceedings of the Joint DELOS-NSF Workshop on Personalisation and Recommender Systems in Digital Libraries, ERCIM Workshop Proceedings 01/W03, pp. 37-42, Jun. 2001.

Jones, K. et al., "A probabilistic model of information retrieval: development and status", Department of Information Science, City University, London, Aug. 1998, 74 pgs.

Kotsakis, E., "Structured Information Retrieval in XML Documents", Proceedings of the ACM Symposium on Applied Computing, Madrid, Spain, 2002, pp. 663-667.

Lalmas, M., "Uniform Representation of Content and Structure for Structured Document Retrieval", 20th SGES International Conference on Knowledge Based Systems and Applied Artificial Intelligence, Cambridge, UK, Dec. 2000, pp. 1-12.

Losee, R. et al., "Research in Information Organization", Literature Review, School of Information and Library Science, Section 4, pp. 53-96, Jan. 2001.

Manning, C. et al., "CS276A Text Information Retrieval, Mining, and Exploitation: Lecture 12", Stanford University CS276A/SYMBSYS2391/LING2391 Test Information Retrieval, Mining and Exploitation, Fall 2002, last modified Nov. 18, 2002, 8 pgs.

Numerico, T., "Search engines organization of information and Web Topology", http://www.cafm.lsbu.ac.uk/eminars/sse/numerico-6-dec-2004.pdf, Dec. 6, 2004, 32 pgs.

Ogilvie, P. et al., "Combining Document Representations for Known-Item Search", Proceedings of the 26th Annual International ACM SIGIR Conference on Research and Development in Information Retrieval, Toronto, Canada, 2003, pp. 143-150.

Robertson, S. et al., "Okapi at TREC-4", 1996, 24 pp.

Robertson, S. et al., "Some Simple Effective Approximations to the 2-Poisson Model for Probabilistic Weighted Retrieval", Proceedings of the 17th Annual International ACM SIGIR Conference on Research and Development in Information Retrieval, 1994, pp. 232-241.

Singhal, A. et al., "AT&T at TREC-9", Proceedings of the Ninth Text Retrieval Conference, NIST Special Publication 500-249, 'Online! 2001, pp. 103-105.

Voorhees, E., "Overview of TREC 2002", Gaithersburg, Maryland, Nov. 19-22, 15 pp.

Web Page "Reuters: Reuters Corpus", http://about.reuter.com/researchandstandards/corpus/, viewed Mar. 18, 2004.

Westerveld, T. et al., "Retrieving Web pages using Content, Links, URLs and Anchors", Proceedings of the Tenth Text Retrieval Conference, NIST Special Publication, 'Online! Oct. 2001, pp. 1-10.

Wilkinson, R., "Effective Retrieval of Structured Documents", Annual ACM Conference on Research and Development, 1994, 7 pp.

Zamir, O. et al., "Grouper: A Dynamic Clustering Interface to Web Search Results", Computer Networks (Amsterdam, Netherlands: 1999), 31(11-16): 1361-1374, 1999.

"Microsoft SharePoint Portal Sever 2001 Resource Kit: Chapter 24, Analyzing the Default Query for the Dashboard", http://www.microsoft.com/technet/prodtechnol/sppt/sharepoint/reskit/part5/c24spprk.mspx, printed on May 22, 2006, 5 pp.

"Microsoft Full-Text Search Technologies", http://www.microsoft.com/technet/prodtechnol/sppt/sharepoint/evaluate/featfunc/mssearc . . . , published on Jun. 1, 2001, printed on May 22, 2006, 13 pp.

"Microsoft External Content in Microsoft Office SharePoint Portal Server 2003", http://www.microsoft.com/technet/prodtechnol/sppt/reskit/c2261881x.mspx, published on Jun. 9, 2004, printed on May 22, 2006, 20 pp.

"Planning Your Information Structure Using Microsoft Office SharePoint Portal Server 2003", http://www.microsoft.com/technet/prodtechnol/sppt/reskit/c0861881x.mspx, published on Jun. 9, 2004, printed on May 22, 2006, 22 pp.

Bandinelli, Luca, "Using Microsoft SharePoint Products and Technologies in Multilingual Scenarios", http://www.microsoft.com/technet/prodtechnol/office/sps2003/maintain/spmultil.mspx, published on Nov. 1, 2003, printed on May 22, 2006, 32 pp.

"SharePoint Portal Server 2001 Planning and Installation Guide", http://www.microsoft.com/technet/prodtechnol/sppt/sharepoint/plan/planinst.mspx, printed on May 22, 2006, 86 pp.

U.S. Appl. No. 11/073,381, filed Mar. 3, 2005 entitled "System and Method for Ranking Search Results Using File Types".

U.S. Appl. No. 10/804,326, filed Mar. 18, 2004 entitled "Field Weighting in Text Document Searching".

U.S. Appl. No. 11/238,906, filed Sep. 29, 2005 entitled "Click Distance Determination".

U.S. Appl. No. 11/412,723, filed Apr. 26, 2006, entitled "Ranking Search Results Using Language Types".

U.S. Appl. No. 10/955,462, filed Sep. 30, 2004 entitled "System and Method for Incorporating Anchor Text Into Ranking Search Results".

U.S. Appl. No. 10/955,983, filed Sep. 30, 2004 entitled "System and Method for Ranking Search Results Using Click Distance".

* cited by examiner

METHOD FOR NORMALIZING DOCUMENT METADATA TO IMPROVE SEARCH RESULTS USING AN ALIAS RELATIONSHIP DIRECTORY SERVICE

BACKGROUND OF THE INVENTION

1. The Field of the Invention

This invention relates to systems, methods, and computer program products for improving computerized search functions by synchronizing document metadata using directory services.

2. Background and Relevant Art

Computerized environments have increased the efficiency by which people perform a wide variety of tasks. For example, computers and computer networks have vastly improved the speed and capabilities by which people communicate ideas to each other. Computerized systems also provide people with enhanced tools for fixing varyingly complex thoughts into an easily accessible medium, which provide far more options than typewriters, pens, pencils, and notepads. Thus, computerized systems greatly enhance information access, and authoring power. In these regards, the advantages of computerized systems are well known.

With regard to information creation, one can author (or create) information as simply as by typing one or two basic text paragraphs in a document that the author may wish to send to another over electronic mail (E-Mail). In other cases, one or many authors may generate thousands of pages in a word processing document, where the word processing document may include several spoken languages, may contain several graphics and other multi-media content, and may comprise a wide variety of electronic formats. In any case, common electronic tools such as a word processor, a web page creator, a text form, and so on help authors affix huge amounts of information into a wide variety of accessible electronic media.

Computerized systems have also enhanced the speed and ability to locate and access this information created by others. Information is accessed and distributed using any one of a number of different techniques and applications, including electronic mail; distributed networks including the Intranet and corporate intranets; database storage and access systems; and the like. However, the overwhelming amount of data and information that is accessible has given rise to problems. In particular, the ability to specifically locate a relevant piece (or pieces) of information, such as a document, from a large and distributed database of information, such as the Internet or a large corporate intranet, has proved to be increasingly difficult.

To address this problem, various types of search tools, sometimes referred to as "search engines," have been developed. While any one of a different number of techniques and search algorithms are used, in general users of a search engine typically enter one or more search terms, and search results corresponding to those terms are returned by the search engine. In a typical implementation, a person may visit an Internet or local webpage that employs a functional text-input box. The person enters one or more search terms into the text box and the search engine may return to the person one or more related documents, depending on the specificity and nature of the search request.

Search engine implementations vary in complexity and capability. A very simple search engine, for example, may only search for exact spellings of certain words within an opened document. Thus, if a user were to type the misspelled word "medixcal" into a search box, the simple search engine will not likely return any results, or point the user to any meaningful point in the document, unless that exact misspelling has been made within the document. A more complex search engine, however, may allow a user to search millions upon millions of documents based on a wide variety of criteria, even allowing the user to add detailed restrictions, all the while compensating for misspellings. For example, a complex search engine may allow a user to search millions of documents on a local or wide area network for the terms "Fyre Engine"+"fire pole"+"Dennis Finch", with the restriction that all results must be in English, and that the resultant web page be created after the year 1998. In some cases, the search engine may even correct the spelling of "Fyre Engine" to "Fire Engine", prior to executing the search.

Figure 1:
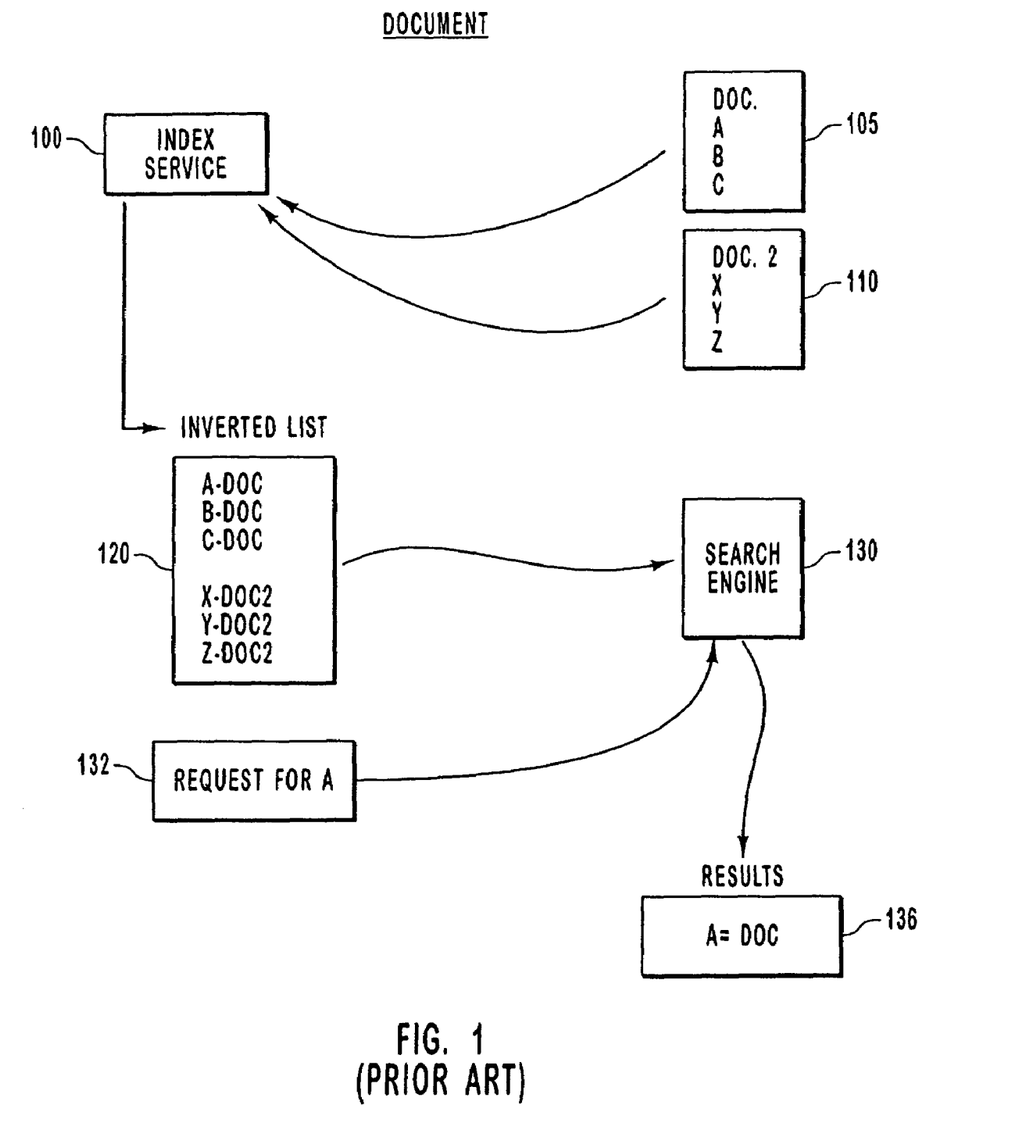
FIG. 1 illustrates a prior art depiction of an indexing and searching service.

FIG. 1 illustrates a prior art depiction of one example of an implementation of a search engine. In this example, the search engine algorithm first obtains several documents (or any analogous discrete unit of information) 105, 110 into a database such as index service 100. In one approach, a user may select and enter documents 105 and 110 manually into the index service 100 to be processed. Alternatively, the index service (or related search service) may have a function that automatically locates and obtains documents. This function is sometimes referred to as "crawling," where the service continually "crawls" across multiple documents on the network by following document reference links within certain documents, and then processing each document as found. The index service 100 processes the documents by identifying key words or general text in the documents 105, 110, and then creating an inverted list 120 (more generally, an "index").

An exemplary inverted list can be one or more electronic reference documents having a column containing a list of key words, a column containing one more documents containing the key word, a column for the number of occurrences of that key word in the respective document, and a column with an address for each associated document. For the purposes of illustration, however, a more simple inverted list 120 is shown having a column of words (A, B, C, etc.), and a column indicating in which document those words can be found.

When a user enters in one or more search terms (e.g., "Request for A" 132), a typical search engine 130 will employ an algorithm that first finds the one or more terms among the key words in the inverted list 120, and then weighs the resultant documents associated with any found words in the list. The search engine can then return one or more of the associated document references as results 136 to the user, depending on how the search algorithm is configured (i.e., documents having the most occurrences of the word), or depending on any restrictions the user places on the search (i.e., requiring an exact phrase match). Consequently, search engines can be quite useful for locating and accessing information contained within, for example, a distributed network environment.

Search engines such as the foregoing, however, tend to have certain limitations. Since the typical such search engine relies on a generated index to locate documents, the relevance of a give search result is highly dependent on the document content that is used to ultimately construct the index. For example, a document containing only the words "whale," "fish," "ocean," and "ferry" would not be found by some search engines if a user entered the terms "orca," "tuna," "sea," and "transport." This is because, in general, search engines of the type described do not generate alternate word relationships when building an inverted list.

While this type of search engine may provide automatic spell-checking of search terms, they do not automatically search word variants, synonyms, and homonyms, unless the user specifically enters them.

In addition, there are other problems that can complicate the amount and quality of data that a search engine can return to a user seeking information. For example, a large organization may have thousands upon thousands of internal documents on various topics posted on various servers on the local or wide area network. While each posted document may contain different metadata corresponding to metadata concepts (i.e., document identifiers) such as author, date created, size, title, etc., each document may be created with different programs that identify metadata properties differently, or describe the underlying data differently. For example, one document might include author metadata as: "Author='Heather F. Pettingill'" while another document's metadata might designate the author as: "By='H. Pettingill'" while yet another document might contain no author metadata and merely include the phrase "H. F. Pettingill" centered at the top of the first page. Thus, if an index were created that includes author metadata, a subsequent search may not locate some of these documents if a search were performed for the author "H. F. Pettingill."

Even if the metadata format is standardized within the organization, the underlying data values that employees may use to classify documents within a general concept in the organization can often undergo several changes. For example, employees may refer to several documents under the classification of "Product Design" one year, and then "Manufacturing Policies" the next year when referring to the same general concept or classification. Similarly, a person's name or contact information may change several times over the course of their employment (i.e., due to name changes, email alias changes, new email domain name, new preferences, new office, new workgroup, etc.).

As such, this can degrade the effectiveness of searches, for example, for all documents authored by "Heather Pettingill," or for all documents discussing product release policies over the last three to five years. For example, with specific reference to FIG. 1, if there were no direct correlation made between the values A and X on inverted list 120 such that A=X (e.g., "Heather Pettingill"="Heather Martin" due to a marital name change), a normal search for A or X would only return "Doc" or "Doc2" (but not both) as a result 136. Typically, the only way the search engine might return both documents is if the user searched for both terms based on prior knowledge of the term correlation. Of course, this approach is limited by the fact that the user may not realize the correlation, though the user wishes to have all documents authored by the person in question.

Accordingly, there is a need for more robust systems, methods, and computer program products that relate the types of information available to a search engine so that more accurate search results can be obtained, without requiring a user to iteratively search several variations of the same terms and phrases. In addition, there is a need for robust systems, methods, and computer program products that allow users to search returned results for additional relationships, such as by metadata concepts, or classification data.

BRIEF SUMMARY OF THE INVENTION

The present invention solves one or more of the foregoing problems in the prior art by introducing systems, methods, and computer program products for normalizing data—such as metadata—for use in a searching algorithm. In one embodiment, a filtering or indexing service retrieves alias information from one or more accessible directory services. The inventive method retrieves this information to normalize such things as contact information, classifications, metadata references, and so on. For example, if the accessed directory service is a personal directory service, the directory service might include a database of all versions of a name by which a person has been (or currently is) recognized. Each version of the person's name can constitute an alias (or, alternate identity).

The directory service may also include various other forms of the person's contact information such as email aliases, prior and current workgroups, office locations and the like. In the case of personal contact information, each of the person's name aliases would then constitute a normalizeable identifier for the same person. The indexing or filtering service may also refer to other forms of information in the directory service as a type of class such that every alias of a person's name might constitute an "Authorship" class, whereas other types of alternate information might constitute a "Workgroup" class, etc. Each class may also be identifiable by one or more aliases (or, alternate identifiers).

Once such information has been normalized (or, "aliased") from the directory service, a gathering service receives one or more documents as inputs, or crawls through various document links on a network, and identifies information segments in the documents as relating to the normalized data. The gathering service then stores these relationships in a way that is accessible to a search engine. Thus, when a user enters a search term into a search engine input box, the search engine consults the alias and/or classification databases as appropriate, and returns a more robust result.

Thus, a user can enter a person's name in one form and get a result from the search engine of all the documents related to that person's name, in whatever form the person has used, without requiring user knowledge of each of the forms. In addition, a user can make an initial search (or search returned results) to find additional property data from the search results that may relate to one or more aliased classes. For example, the user may enter a search of all documents created for the new topic name "Product Design", and the search engine can return all the documents related to "Product Design", without missing documents with a different topic name (e.g., "Manufacturing Specs").

Additional features and advantages of the invention are set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention cam be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to both methods and systems for normalizing document metadata using directory services. Disclosed embodiments may comprise a special purpose or general-purpose computer including various computer hardware implementations, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 2:
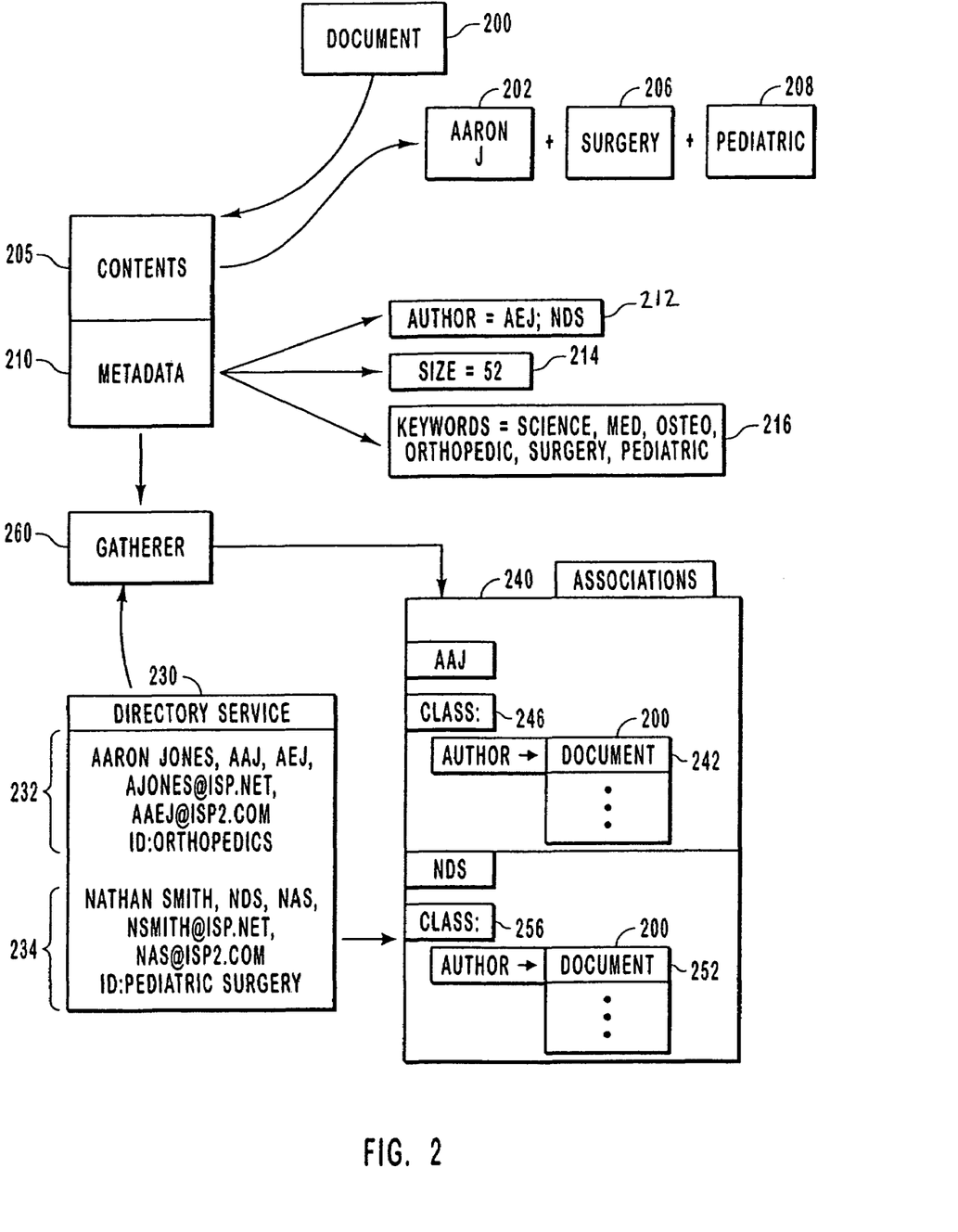
FIG. 2 illustrates one embodiment of representing document data objects and identifiers in accordance with the present invention.

Reference is next made to FIG. 2, which illustrates an exemplary representation of document data objects and identifiers that might be used in connection with an embodiment of the present invention. Illustrated is an electronic document 200, which may be of a wide variety of formats. In the example, document 200 can be broken down into at least two component parts: a content portion 205 and a metadata portion 210. In this example, the content portion 205 is the data entered by a user creating the document, e.g., the text of a word processing document. The contents 205 can be broken down into sections that represent size portions of the document, for example by page, or by words, phrases, and letters, in the case of a text document. Here, the document 200 has multiple "content segments" (also referred to as "chunks") such as a name "Aaron J" 202, "Surgery" 206, and "Pediatric" 208. Each of these content segments can be representative of a particular property of the document.

The other component part of the document, referred to here as metadata 210, represents specific properties or characteristics associated with the document. Metadata may be entered by a user when creating a document, or may be entered through default settings in an application program. For example, one might discover metadata by opening a "properties") portion of an opened document, or by some similar method. Thus, metadata 210 are meant to give information that can help characterize the contents in some way. By way of example, the metadata 210 in FIG. 2 include metadata concepts (or "segments")), such as an "Author" segment 212, a file "Size" segment 214, and a "Keywords" segment 216. The metadata concepts are like classifications in the sense that they can be more generalized concepts of the more specific, underlying data content 205. Thus, a class is appropriately defined as a set of documents, and a label (e.g., all documents "Authored" by person A).

For example, the "Author" segment 210 indicates that "AEJ" and "NDS" are authors of the document 200. It could be that both "AEJ" and "NDS" manually entered this information when initially creating the document, or that an application may have merely tracked this information as both "AEJ" and "NDS" entered information into the document from different locations. The "Size" segment 214 indicates that the size of the document 200 is 52 Kb. The "Size" segment 214 could be a value that is automatically updated when the document is saved, for example. The "Keywords" segment 214 includes keyword data that represents, for example, the general concepts addressed by the content of the document. Here, keywords segment 214 shows that the document 200 content is related to the terms "Science, Med, Osteo, Orthopedic, Surgery, and Pediatric." Again, these keywords could be manually entered, or could be automatically extracted from the content of the document itself.

FIG. 2 also shows an exemplary directory service 230, as can be used in connection with the example implementation. In the example, the directory service may contain one or more entries (such as is denoted here at 232 and 234), that each contain one or more data fields. For example, the entry 232 is for "Aaron Jones." That entry includes data fields for additional name aliases "AAJ," "AEJ," as well as different email addresses at different Internet Service Providers (ISPs). In addition, there is a secondary identifier "ID: ORTHOPEDICS." Similarly, there is an entry 234 for Nathan Smith, which includes data fields for name aliases "NDS" and "NAS," as well as different email addresses at different ISPs. This entry also includes a data field for a secondary identifier, shown here as "ID:PEDIATRIC SURGERY." It will be appreciated that these types of data fields are merely examples, and that any one of a different number and/or type of data field may included in a particular entry. Also, it will be appreciated that a directory service may be as complex as a centralized, relational database in an organization, or may be as simple as a single text document relating one or more terms to one or more other corresponding alternative terms.

As is further shown in FIG. 2, each of the data field indicia (and other fields not shown) contained in the relative entries 232, 234 can be parsed by a gatherer function, denoted at 260, to provide an individualized association database 240 (e.g., an "alias" database). In the example shown, the association database 240 contains information from the parsed directory service 230. More particularly, in this example each contact entry 232, 234 is associated with one or more classes, denoted here at 246 and 256. As will be explained further, classes may be based on a general metadata concept, or may comprise a wide variety of other types of designations. In the example shown, one type of class in the database 240 could be authorship, and each contact entry 232, 234 is associated with one or more documents 200. The association database 240 can be configured to relate a wide variety of data from the directory service, and may be combined with a searchable index (e.g., the inverted index 120 in FIG. 1) to provide an enriched inverted index, as will be discussed in more detail.

Figure 3:
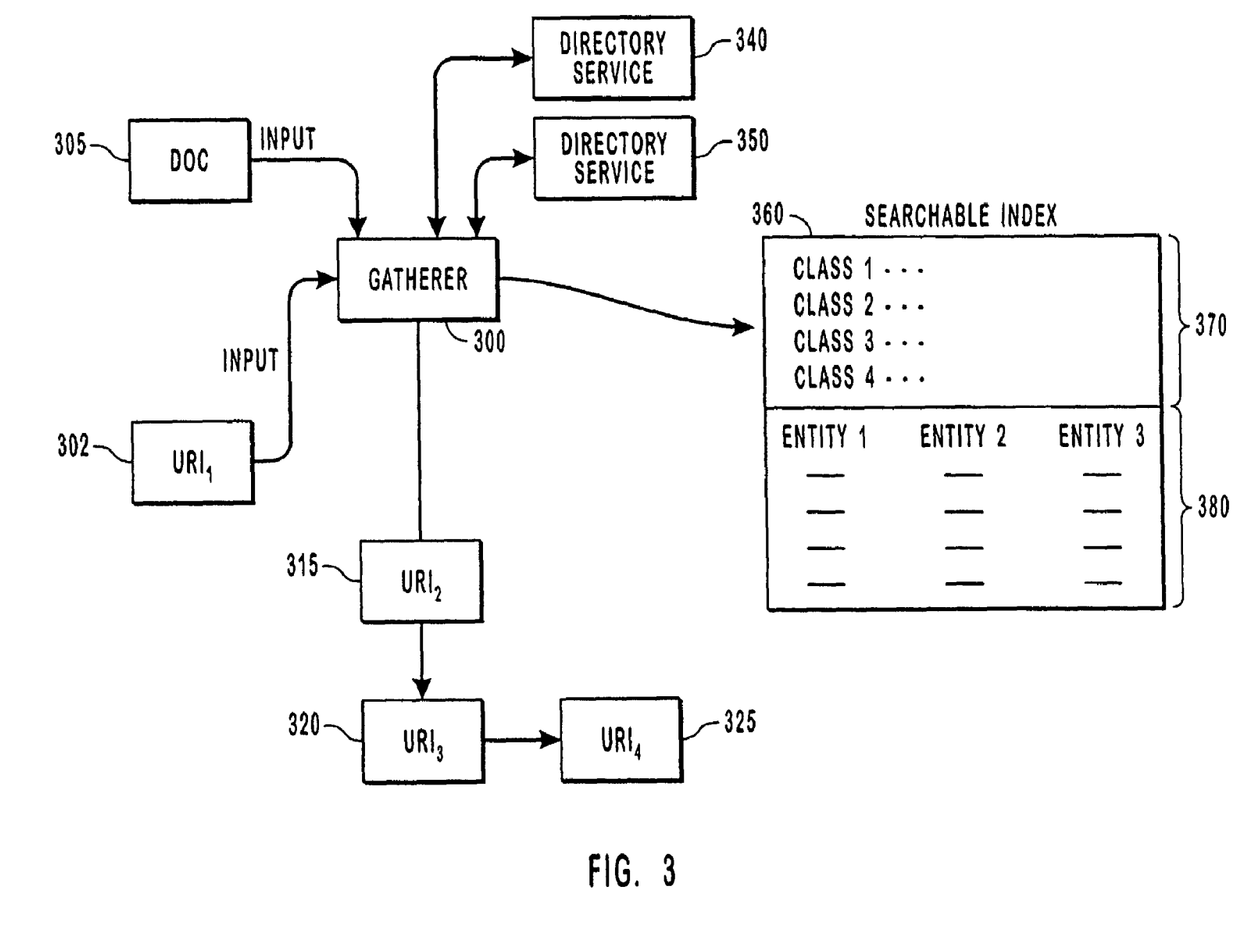
FIG. 3 illustrates one embodiment of an overview block diagram of inputs and outputs of a gatherer data structure.

FIG. 3 illustrates one embodiment of the methodology by which the gatherer function, here designated at module 300, generates a searchable index 360 based on a variety of inputs. A gatherer 300 may be a functional executable program, or may be a plug-in module to a more complicated overall executable program such as a search engine. In either case, a gatherer 300 references one or more directory services (denoted in the example as 340 and 350) to ascertain a collection of aliases for one or more terms, as described in FIG. 2. The gatherer 300 may reference the directory services as the gatherer 300 processes various documents on the network, or the gatherer may receive a list of values (e.g., aliases) from the directory service in the form of a file that the gatherer recognizes as a definition set of aliases for different terms. The provided aliases allow the gatherer to have a "normalized" frame of reference for associating a network document with an entity or class. In other words, the gatherer 300 can now recognize that several word variants mean the same thing.

To process documents, the gatherer 300 may first receive a document 305 as an input in some cases, such as a user entering certain document metadata before the user saves the document 305 on a network database. Or, the gatherer 300 may "crawl" throughout documents on a local or wide area network. As noted, crawling refers to a program module following links between various documents on a network in order to find and process additional documents. A gatherer 300 may crawl a network on its own initiative based on preset parameters, or a user may "seed" the gatherer 300 with a first network-based Uniform Resource Identifier (URI) 302. Once the gatherer 300 receives an input seed, the gatherer 300 may then follow any links or references contained within the document located at the first URI 302, following a trail through a second URI 315, a third URI 320, and a fourth URI 325 as it processes the respective documents.

The gatherer 300 processes the respective document by breaking the encountered document into one or more segments. In some cases, the gatherer 300 may first need to decode the document it is processing into a readable format. Once the gatherer 300 can read the format, and has divided the document into segments, the gatherer 300 attempts to identify portions of the segments based on the normalized alias information the gatherer 300 has referenced from the one or more directory services (e.g., 340, 350). For example, the segments may be some form of defined metadata concepts (e.g., "Author," "Type," "Workgroup," etc.), or some type of non-defined text (e.g., underlined section headings).

For example, the gatherer 300 might identify URI$_2$ 315 as having an "Author" value of "NDS", and a "Keyword" value of "pediatrics". Alternatively, the gatherer 300 may find no such formal metadata concepts in URI$_4$ 325, but notice that the name "AJONES@ISP.NET" is centered at the top of the document, and so assign that document an "Author" value of "AJONES@ISP.NET." After consulting the alias references, the gatherer 300 could then identify that "NDS"="Nathan Smith" 234, and that "AJONES@ISP.NET"="Aaron Jones" 232, along with other values, and then place those associations for the documents found at the respective URIs in a searchable index 360.

An exemplary searchable index 360 may have a defined set of classes 370 such as an "Author" class, a "Workgroup" class, and may further include a set of class aliases by which each class might be known in the organization, as well as a list of documents or entities that could belong to those classes. The searchable index 360 may also include a collection of entities 380 that relate to each of the classes. Entities may represent persons (e.g., a collection of aliases that identify the person) or class members, are used to establish relationships across classes, and are used for alias mapping. Class members are usually documents, or indexable entities having some property (i.e., metadata) that identifies them with a certain class. A class is then a "set" (i.e., a collection of objects that can be identified as belonging to the set) of these class members, and can be represented as a "set" in the mathematical sense. Thus, as in the example above, contact entry 232 for "Aaron Jones" may be represented as an entity in a searchable index, where the entity may include several name and group aliases, and may also include other types of values relating to one or more classes.

Figure 4:
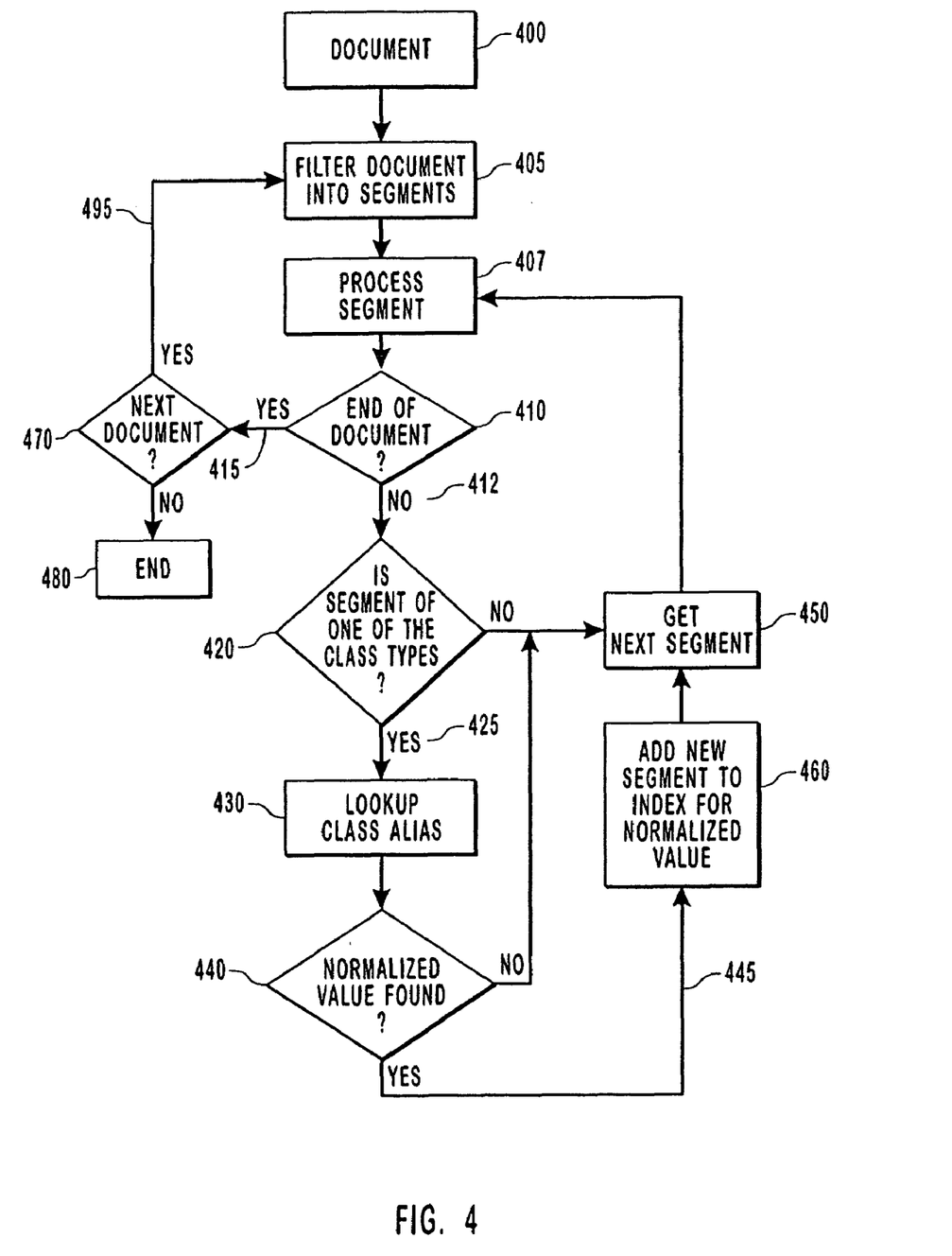
FIG. 4 illustrates a flow chart that may be used to implement a gathering process in accordance with the present invention.

FIG. 4 illustrates a flow chart showing the functional steps that may be used to implement one example implementation of the gathering process, particularly in the context of recognizing classes. For purposes of illustration, the gatherer is assumed to have already received one or more values from a directory service such that the gatherer has a reference for one or more aliases and or one or more classes. Continuing with FIG. 4, a document 400 is received by a gatherer (e.g., gatherer 300), and then filtered 405 into one or more documents segments. Once the document has been filtered 405 into one or more segments, the gatherer processes the segment 407 by determining if the segment represents the end of the document 410. For example, the gatherer may look for a document-ending marker such as an End Of File (EOF) designator.

If the segment does not signal the end of the document 412, then the gatherer processes the segment further to determine if the segment matches one of the class types 420 (e.g., "By AEJ"). If the segment appears to be a valid class type 425, then the gatherer will seek to identify 430 whether there is a known class alias for the apparent class type (e.g., "By=Author=From=Written_By"). If there is no known class alias for the segment so that "By" represents any specific meaning, the gatherer will move to the next segment 450 for processing. If on the other hand, there is 445 an alias identifying the class type (e.g., "By" is recognized as an "Author" metadata concept), then the gatherer can seek to identify 440 whether a normalized value is found. If a normalized value is found, the gatherer then associates 460 the segment with the appropriate class by mapping the segment value to a preferred class label, and looks to see if any metadata associated with the class type are also aliases (i.e., "normalized" for a standard value—"AEJ='Aaron E. Jones'") so that the class type property may be called for the normalized metadata (or alias for the normalized metadata) and vice versa. Having associated 460 the segment with any available classes and/or corresponding metadata, the gatherer adds the segment to a searchable index (e.g., 360) by association with the normalized value, and then proceeds to get the next segment 450. If on the other hand, no normalized value is found, the gatherer may not add a new segment and may proceed to get the next segment 450.

If the next segment 450 resembles an end of document designator 415, the gatherer determines if there is a next document 470 to filter into segments. For example, the gatherer may detect that there is an embedded URI for a next document (e.g., "crawling"), or the gatherer may detect a next document as input received in queue from another input method (e.g., a file list). If the gatherer detects a next document, 495, then the gatherer proceeds to filter the next document into segments, and continues the previously-described processing path. Alternatively, if the gatherer detects no new document, the gatherer ceases processing documents 480.

Example embodiments of the present invention also may be described in terms of methods comprising functional steps and/or non-functional acts. The following is a description of acts and steps that may be performed in practicing one exemplary embodiment. Usually, functional steps describe the invention in terms of results that are accomplished, whereas non-functional acts describe more specific actions for achieving a particular result. Although the functional steps and non functional acts may be described or claimed in a particular order, the present invention is not necessarily limited to any particular ordering or combination of acts and/or steps.

Figure 5:
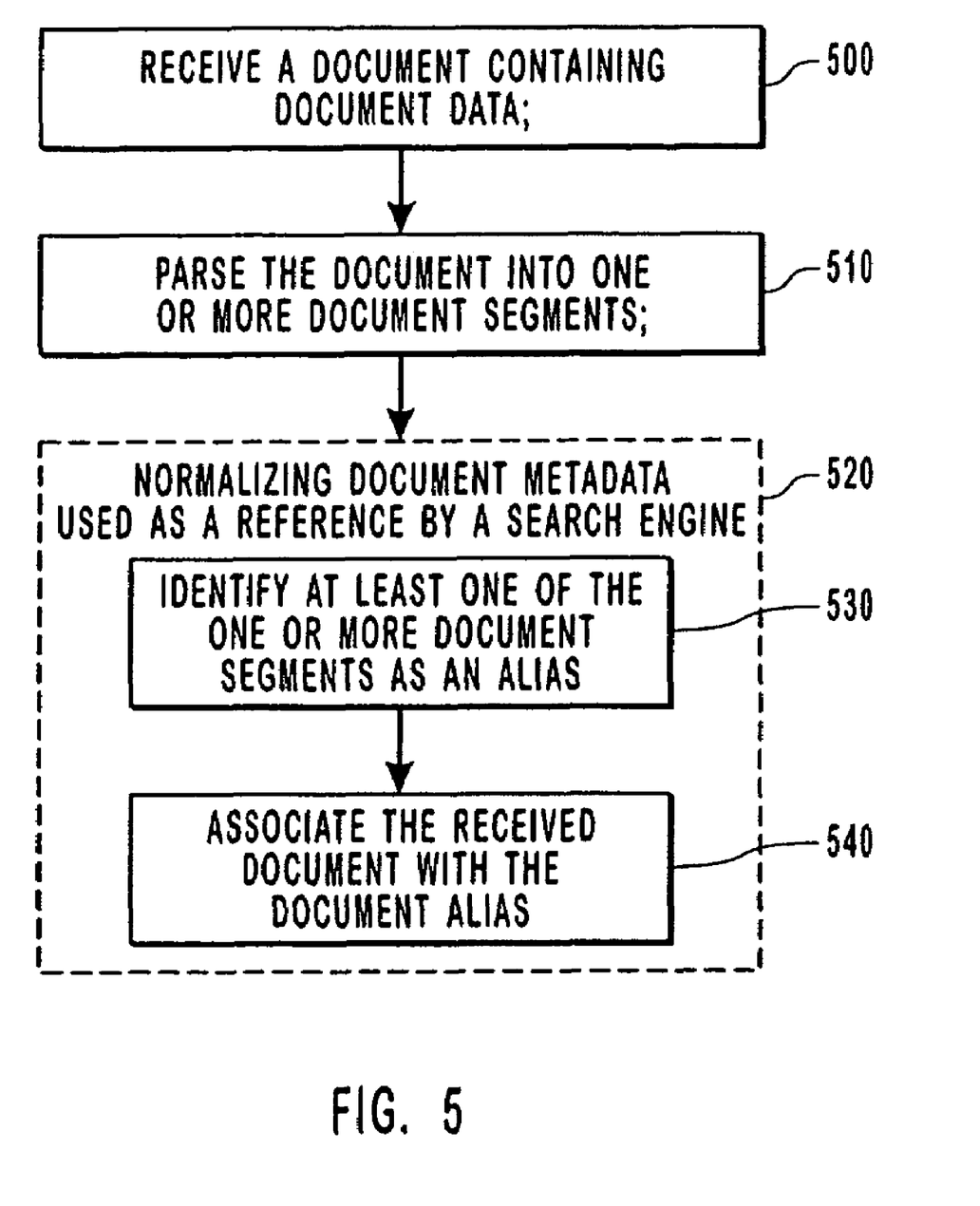
FIG. 5 illustrates a flow chart of acts and functional steps for practicing one embodiment of the present invention.

FIG. 5 illustrates a flow chart of acts and functional steps for practicing one embodiment of the present invention, and will be described with reference to the foregoing figures. As shown, the inventive method may begin by performing the act of first receiving 500 a document 205 containing document data. As described, the document may contain specific references to metadata concepts and may have as values the underlying metadata corresponding to the metadata concepts. Having received the document 500 as input (or having crawled to the document via a URI), the inventive method may parse 510 the document into one or more document segments. This may be done by, for example, filtering the document 405 into document segments as described in FIG. 4. These filtered segments may as simple as data blocks having text values 202, 206, and 208, or may be more complicated in the sense of containing text and textual relationship values to a corresponding class or metadata concept, such as data blocks 210, 214, and 216.

Thereafter, the inventive method performs the functional step 520 of normalizing document metadata used as a reference by a search engine. This step can include normalizing document metadata used as a reference by a search engine by maintaining one or more relationships between a search term and an alternate search term, a search term property or alternative search term property. Functional step 520 may be performed by the specific non-functional act of identifying 530 at least one of the one or more document segments as an alias; and by a non-functional act of associating 540 the received document with the document alias.

Act 530 may be performed by identifying at least one of the one or more document segments as an alias for a document datum found in an alias directory service. Thus, for example, the inventive method may process a directory service and then store a series of aliases that refer to a main text value, such as in the case of "Aaron E. Jones" (i.e., contact entry 232) being recognized by several monikers such as "Aaron Jones", "AAJ", "AEJ", "AEJONES@ISP.NET", etc. Similarly, the inventive method may additionally or alternatively store class type values so that, for example, a search for all documents authored by a person can be found without regard to the various aliases the person has used over time. A document datum found in an alias directory might include, for example, the name "NDS" as an alias for the name "Nathan Smith" in contact entry 234, and that "Nathan Smith" is further associated (via an associations database 240) as an "Author" (e.g., class 256) of a particular document (e.g., document 200).

Act 540 may be performed by associating the received document with the document alias so that, upon request for the document datum through a search engine, the received document is returned to the requester by association of the document datum with the alias. Thus, for example, if a person enters the term "Nathan Smith" into a search engine input box and then executes the search, the search engine will look for any occurrence of the term "Nathan Smith." The search engine will also look for all documents containing the associated aliases (e.g., terms "NDS," and "NAS," from contact entry 252 of FIG. 2), since the term "Nathan Smith," and each of the received aliases have been normalized. 242 is a contact entry associated with the name Aaron Jones, as shown in FIG. 2.

In addition, the concept of normalizing the class type (e.g. "Author") can be applied to train a statistical model used by the gatherer based on each set of documents (tagged with all alias forms) belonging to the respective class. That is, embodiments of the present invention may progressively modify its understanding of search terms to interrelate and associate concepts and metadata more correctly, or to "fine-tune" how the gatherer 300 relates documents and document data. For example, after crawling various documents on a network, the gatherer 300 may be trained to correctly discover other related documents to the given author, and other people related to the author, or to identify other concepts related to documents associated with the author, and so on. Accordingly, a statistical model can be trained for each class, so that there are as many statistical models as there are classes (e.g., in the case of authors, there would be a model for each author). Since a statistical model is usually represented as a set of key terms (i.e., keywords) with associated weights (i.e., importance), it is important to identify the set of documents that belong to the class correctly. Using aliases, as described herein, is one way of identifying the correct set of documents, and, ultimately, training of the statistical model.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where local and remote processing devices perform tasks and are linked (either by hardwired links, wireless links, or by a combination of hardwired or wireless links) through a communications network. In a distributed computing environment, program modules may be located in both local and remote memory storage devices.

Figure 6:
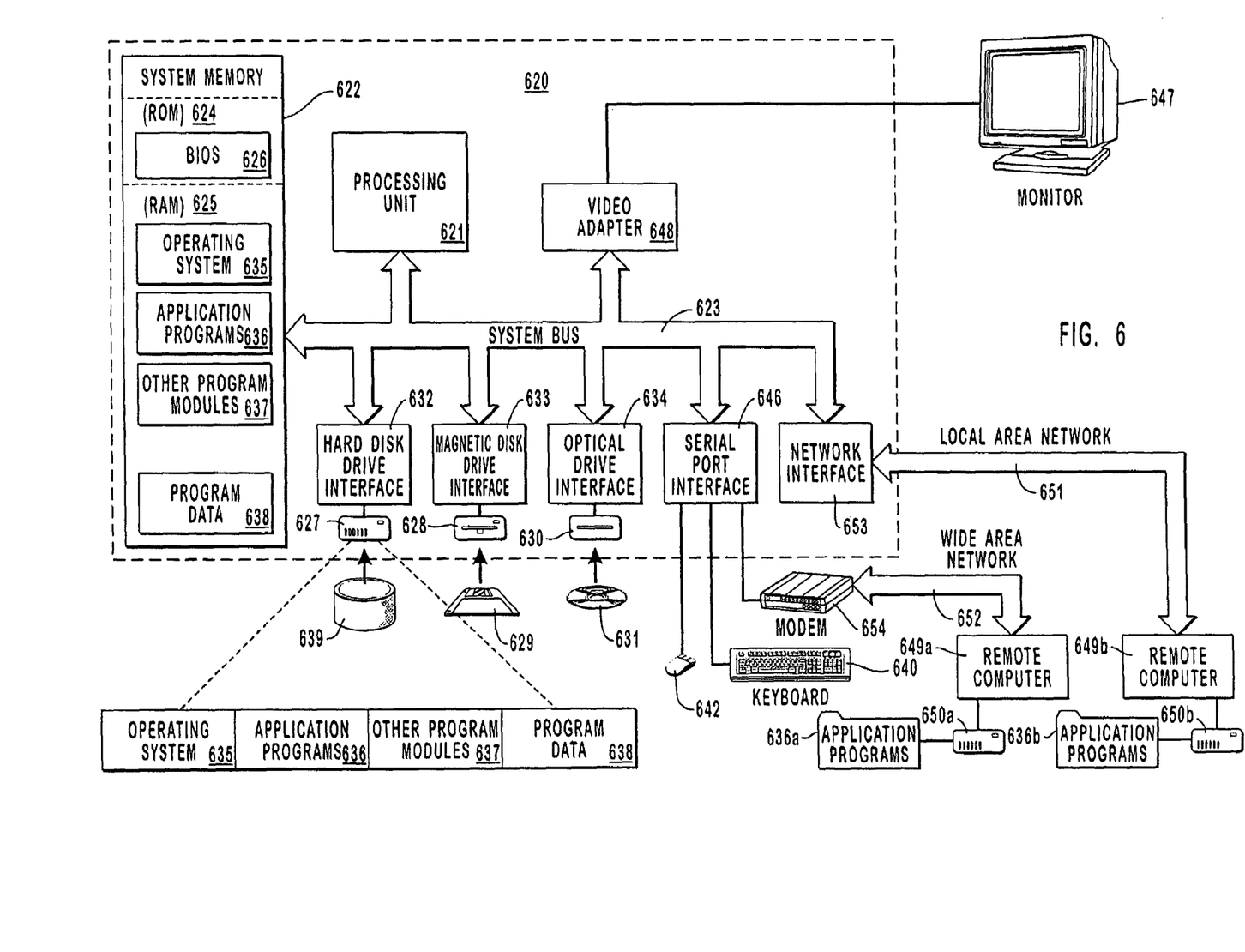
FIG. 6 illustrates a suitable computing environment that may be used to practice the present invention.

FIG. 6 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that performs particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

With reference to FIG. 6, an exemplary system for implementing the invention includes a general-purpose computing device in the form of a conventional computer 620, including a processing unit 621, a system memory 622, and a system bus 623 that couples various system components including the system memory 622 to the processing unit 621. The system bus 623 may be any of several types of bus structures including a memory bus or memory controller, a peripheral bus, and a local bus using any of a variety of bus architectures. The system memory includes read only memory (ROM) 624 and random access memory (RAM) 625. A basic input/output system (BIOS) 626, containing the basic routines that help transfer information between elements within the computer 620, such as during start-up, may be stored in ROM 624.

The computer 620 may also include a magnetic hard disk drive 627 for reading from and writing to a magnetic hard disk 639, a magnetic disc drive 628 for reading from or writing to a removable magnetic disk 629, and an optical disc drive 630 for reading from or writing to removable optical disc 631 such as a CD ROM or other optical media. The magnetic hard disk drive 627, magnetic disk drive 628, and optical disc drive 630 are connected to the system bus 623 by a hard disk drive interface 632, a magnetic disk drive-interface 633, and an optical drive interface 634, respectively. The drives and their associated computer-readable media provide nonvolatile storage of computer-executable instructions, data structures, program modules and other data for the computer 620. Although the exemplary environment described herein employs a magnetic hard disk 639, a removable magnetic disk 629 and a removable optical disc 631, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 639, magnetic disk 629, optical disc 631, ROM 624 or RAM 625, including an operating system 635, one or more application programs 636, other program modules 637, and program data 638. A user may enter commands and information into the computer 620 through keyboard 640, pointing device 642, or other input devices (not shown), such as a microphone, joy stick, game pad, satellite dish, scanner, or the like. These and other input devices are often connected to the processing unit 621 through a serial port interface 646 coupled to system bus 623. Alternatively, the input devices may be connected by other interfaces, such as a parallel port, a game port or a universal serial bus (USB). A monitor 647 or another display device is also connected to system bus 623 via an interface, such as video adapter 648. In addition to the monitor, personal computers typically include other peripheral output devices (not shown), such as speakers and printers.

The computer 620 may operate in a networked environment using logical connections to one or more remote computers, such as remote computers 649a and 649b. Remote computers 649a and 649b may each be another personal computer, a server, a router, a network PC, a peer device or other common network node, and typically include many or all of the elements described above relative to the computer 620, although only memory storage devices 650a and 650b and their associated application programs 636a and 636b have been illustrated in FIG. 6. The logical connections depicted in FIG. 6 include a local area network (LAN) 651 and a wide area network (WAN) 652 that are presented here by way of example and not limitation. Such networking environments are commonplace in office-wide or enterprise-wide computer networks, intranets and the Internet.

When used in a LAN networking environment, the computer 620 is connected to the local network 651 through a network interface or adapter 653. When used in a WAN networking environment, the computer 620 may include a modem 654, a wireless link, or other means for establishing communications over the wide area network 652, such as the Internet. The modem 654, which may be internal or external, is connected to the system bus 623 via the serial port interface 646. In a networked environment, program modules depicted relative to the computer 620, or portions thereof, may be stored in the remote memory storage device. It will be appreciated that the network connections shown are exemplary and other means of establishing communications over wide area network 652 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. In a computerized environment, a method of normalizing document data to improve results of search requests, the method comprising the acts of:

receiving a first document containing first document data and a link to a second document, wherein the second document contains second document data;

parsing the first document data into one or more first document segments;

identifying at least one of the one or more first document segments as a first document alias that correlates with a first document datum found in an alias directory service;

associating the received first document with the first document alias so that, upon request for the first document datum through a search engine, the received first document is returned to a requester by association of the first document datum with the first document alias;

parsing the second document data into one or more second document segments;

identifying at least one of the one or more second document segments as a second document alias that correlates with a first document datum found in the alias directory service; and associating the received second document with the second document alias so that, upon request for the second document datum through the search engine, the received second document is returned to the requester by association of the second document datum with the second document alias.

2. The method of claim 1, wherein the first document data are metadata, and wherein the first document alias is a document metadatum.

3. The method of claim 1, wherein the alias directory service is a contact database containing one or more aliases for one or more terms associated with one or more corresponding contacts.

4. The method of claim 1, further comprising identifying the document segment as part of a predefined class and/or a class alias, so that a data request through the search engine returns the requested data to the requester when the requester enters a the identified class, the class alias, and/or the alias.

5. The method of claim 4, wherein the predefined class and/or class alias is a weighted value for one or more associated terms, a metadata concept, and/or a property type.

6. The method of claim 4, further comprising associating a term in an inverted index with a the identified alias and/or the predefined class and/or class alias; and storing the inverted index for use by the search engine.

7. The method of claim 5, wherein the property type is an authorship property.

8. The method of claim 5, wherein a classification module further implements the method comprising:

identifying a next document containing next document data that can be identified with the class, whereby the class comprises at least the document containing document data and the next document containing next document data; and based on the document data and the next document data, identifying additional documents within the class, so that the classification module is trained to associate additional documents with the class that would not have otherwise been identified.

9. In a computerized environment, a method of normalizing document data to improve results of search requests, the method comprising:

an act of receiving a first document containing first document data and a link to a second document, wherein the second document contains second document data;

an act of parsing the first document data into one or more first document segments;

an act of receiving the second document containing second document data;

an act of parsing the second document data into one or more second document segments; and a step for normalizing document metadata used as a reference by a search engine by maintaining one or more relationships between a search term and an alternate search term, a search term property and/or alternative search term property.

10. The method of claim 9, further comprising:

following the link to the second document;

an act of identifying at least one of the first document segments as an alias for a document datum found in an alias directory service; and an act of associating the received first document with the document alias so that, upon request for the document datum through the search engine, the received first document is returned to the requester by association with the alias.

11. The method of claim 9, further comprising receiving, by a gatherer module, directory service data that include one or more aliases for a metadatum.

12. The method of claim 11, further comprising parsing the directory service data; and associating the parsed data with one or more classes so that one or more documents are related by one or more corresponding classes and one or more metadata aliases.

13. A computer program product having computer-executable instructions for performing a method of normalizing document data to improve results of search requests, the method comprising the acts of:

receiving a first document containing first document data and a link to a second document, wherein the second document contains second document data;

parsing the first document data into one or more first document segments;

identifying at least one of the one or more first document segments as a first document alias that correlates with a first document datum found in an alias directory service;

associating the received first document with the first document alias so that, upon request for the first document datum through a search engine, the received first document is returned to a requester by association of the first document datum with the first document alias;

parsing the second document data into one or more second document segments;

identifying at least one of the one or more second document segments as a second document alias that correlates with a first document datum found in the alias directory service; and associating the received second document with the second document alias so that, upon request for the second document datum through the search engine, the received second document is returned to the requester by association of the second document datum with the second document alias.

14. The computer program product of claim 13, wherein the first document data are metadata, and wherein the first document alias is a document metadatum.

15. The computer program product of claim 13, wherein the alias directory service is a contact database containing one or more aliases for one or more terms associated with one or more corresponding contacts.

16. The computer program product of claim 13, further comprising identifying the first document segment as part of a predefined class and/or a class alias, so that a data request through the search engine returns the requested data to the requester when the requester enters the identified class, the class alias, and/or the alias.

17. The computer program product of claim 16, wherein the predefined class and/or class alias is a weighted value for one or more associated terms, a metadata concept, and/or a property type.

18. The computer program product of claim 16, further comprising associating a term in an inverted index with the identified alias and the predefined class and/or class alias; and storing the inverted index for use by the search engine.

19. The computer program product of claim 17, wherein the property type is an authorship property.

20. The computer program product of claim 17, wherein a classification module further implements the method comprising:

identifying a next document containing next document data that can be identified with the class, whereby the class comprises at least the document containing document data and the next document containing next document data; and based on the document data and the next document data, identifying additional documents within the class, so that the classification module is trained to associate additional documents with the class that would not have otherwise been identified.

21. A computer program product having computer-executable instructions for performing a method of normalizing document data to improve results of search requests, the method comprising:

an act of receiving a first document containing first document data and a link to a second document, wherein the second document contains second document data;

an act of parsing the first document data into one or more first document segments;

an act of receiving the second document containing second document data;

an act of parsing the second document data into one or more second document segments; and a step for normalizing document metadata used as a reference by a search engine by maintaining one or more relationships between a search term and an alternate search term, a search term property and/or alternative search term property.

22. The computer program product of claim 21, further comprising:

an act of following the link to the second document;

an act of identifying at least one of the first document segments as an alias for a document datum found in an alias directory service; and an act of associating the received first document with the document alias so that, upon request for the document datum through the search engine, the received document is returned to the requester by association with the alias.

23. The computer program product of claim 21, further comprising receiving, by a gatherer module, directory service data that include one or more aliases for a metadatum.

24. The computer program product of claim 23, further comprising parsing the directory service data; and associating the parsed data with one or more classes so that one or more documents are related by one or more corresponding classes and one or more metadata aliases.

* * * * *